(12) United States Patent
Hiddink et al.

(10) Patent No.: US 8,189,039 B2
(45) Date of Patent: May 29, 2012

(54) AUTOSTEREOSCOPIC DISPLAY DEVICE

(75) Inventors: Martin Gerard Hendrik Hiddink, Eindhoven (NL); Siebe Tjerk De Zwart, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1020 days.

(21) Appl. No.: 12/097,373

(22) PCT Filed: Dec. 5, 2006

(86) PCT No.: PCT/IB2006/054605
§ 371 (c)(1),
(2), (4) Date: Jun. 13, 2008

(87) PCT Pub. No.: WO2007/069131
PCT Pub. Date: Jun. 21, 2007

(65) Prior Publication Data
US 2009/0046143 A1    Feb. 19, 2009

(30) Foreign Application Priority Data

Dec. 14, 2005  (EP) .................................... 05112120

(51) Int. Cl.
  *H04N 13/04*  (2006.01)
  *H04N 9/47*  (2006.01)
(52) U.S. Cl. .......................................... 348/59; 349/15
(58) Field of Classification Search .................... 348/46; 349/15
See application file for complete search history.

(56) References Cited

U.S. PATENT DOCUMENTS

| 4,752,774 A | 6/1988 | Clerc et al. |
| 6,069,650 A | 5/2000 | Battersby |
| 6,831,678 B1 * | 12/2004 | Travis ............................. 348/46 |
| 7,518,664 B2 * | 4/2009 | Mather et al. .................. 349/15 |
| 7,646,438 B2 * | 1/2010 | Park et al. ....................... 349/15 |

FOREIGN PATENT DOCUMENTS

| EP | 0833183 A1 | 4/1998 |
| GB | 2398130 A | 8/2004 |
| JP | 02006922 A | 1/1990 |
| JP | 2005134663 A | 5/2005 |
| WO | WO9821620 A1 | 5/1998 |
| WO | WO03071335 A2 | 8/2003 |

* cited by examiner

*Primary Examiner* — Dustin Nguyen
(74) *Attorney, Agent, or Firm* — Larry Liberchuk (57) ABSTRACT

A drive method and apparatus is provided for a 2D/3D autostereoscopic display with a switchable lens array having an electrically switchable refractive index, between an array of row electrode lines and an array of column electrode lines to control the switching of the lens elements. The drive signals comprise: a row select voltage waveform (Rsw), —a column select voltage waveform (Csw), —and a common row and column de-select voltage waveform (Vbase). The waveforms each comprise a substantially square wave voltage waveform, each waveform having the same period. The three waveforms are time staggered with respect to each other with a phase shift of 2/3 or 4/3 between each waveform and each other waveform. This arrangement provides polarity inversion voltage waveforms when switching voltages are applied to the lens elements, and with maximized RMS voltage.

14 Claims, 5 Drawing Sheets

AUTOSTEREOSCOPIC DISPLAY DEVICE

FIELD OF THE INVENTION

This invention relates to an autostereoscopic display device of the type that comprises a display panel having an array of display pixels for producing a display and a plurality of imaging means, such as lenticular elements, arranged over the display panel and through which the display pixels are viewed.

BACKGROUND OF THE INVENTION

A known autostereoscopic display device comprises a two dimensional liquid crystal display panel having a row and column array of display pixels acting as a spatial light modulator to produce the display. An array of elongate lenticular elements extending parallel to one another overlies the display pixel array, and the display pixels are observed through these lenticular elements.

The lenticular elements are provided as a sheet of elements, each of which comprises an elongate semi-cylindrical lens element. The lenticular elements extend in the column direction of the display panel (or slanted with respect to the column direction), with each lenticular element overlying a respective group of two or more adjacent columns of display pixels.

In an arrangement in which, for example, each lenticule is associated with two columns of display pixels, the display pixels in each column provide a vertical slice of a respective two dimensional sub-image. The lenticular sheet directs these two slices and corresponding slices from the display pixel columns associated with the other lenticules, to the left and right eye of a user positioned in front of the sheet, so that the user observes a single stereoscopic image. The sheet of lenticular elements thus provides a light output directing function.

In other arrangements, each lenticule is associated with a group of more than two adjacent display pixels in the row direction. Corresponding columns of display pixels in each group are arranged appropriately to provide a vertical slice from a respective two dimensional sub-image. As a user's head is moved from left to right a series of successive, different, stereoscopic views are perceived creating, for example, a look-around impression.

The above described device provides an effective three dimensional display. However, it will be appreciated that, in order to provide stereoscopic views, there is a necessary sacrifice in the resolution of the device. This sacrifice in resolution is unacceptable for certain applications, such as the display of small text characters for viewing from short distances. For this reason, it has been proposed to provide a display device that is switchable between a two-dimensional mode and a three-dimensional (stereoscopic) mode.

In the two-dimensional mode, the lenticular elements of the switchable device operate in a "pass through" mode, i.e. they act in the same way as would a planar sheet of optically transparent material. The resulting display has a high resolution, equal to the native resolution of the display panel, which is suitable for the display of small text characters from short viewing distances. The two-dimensional display mode cannot, of course, provide a stereoscopic image.

In the three-dimensional mode, the lenticular elements of the switchable device provide a light output directing function, as described above. The resulting display is capable of providing stereoscopic images, but has the inevitable resolution loss mentioned above.

In order to provide switchable display modes, the lenticular elements of the switchable device are formed of an electro-optic material, such as a liquid crystal material, having a refractive index that is switchable between two values. The device is then switched between the modes by applying an appropriate electrical potential to planar electrodes provided above and below the lenticular elements. The electrical potential alters the refractive index of the lenticular elements in relation to that of an adjacent optically transparent layer. A more detailed description of the structure and operation of the switchable device can be found in U.S. Pat. No. 6,069,650, the entirety of which is incorporated herein by reference.

It has been recognised that it is desirable to provide a switchable autostereoscopic display device having a display in which different portions of the display area may be operated in different modes, for example the 2D display of text, and the 3D display of images.

In order to provide some freedom of selection of the areas to be operated in 2D and in 3D modes, both electrode layers should be patterned. In particular, by providing one electrode layer as an array of first electrode lines, and the other electrode layer as a perpendicular array of second electrode lines, the electrodes can act as a matrix addressing scheme to enable rectangular blocks of display area to be selected.

In addition to enabling local switchability, by patterning both electrode layers into a matrix structure of n rows and m columns, this results in n*m sub cells which can be switched in 2D or 3D mode by only n+m drivers. This therefore also enables efficient driver hardware and software to be implemented.

SUMMARY OF THE INVENTION

This invention relates to display devices using this type of switchable lens array.

The switching of an LC material lenticular lens is achieved by applying a sufficiently high voltage across the LC material to change the effective refractive index of the LC for light with the proper polarization. By matching the refractive index of the lenticular structure with one of the LC indices, a mode with no lens action is provided. In the other mode, there is an effective difference in refractive index for the polarized light and therewith a lens action. Depending on the design, the lens is switched from 3D mode to 2D mode by applying either a non-zero voltage or zero voltage difference across the cell.

An issue of these cells is the driver voltage. Depending on the design, voltages up to 100 volts are required for proper switching. As drivers become more expensive with increasing voltage, it is desirable to reduce the driver voltage levels if possible.

According to the invention, there is provided a switchable autostereoscopic display device comprising:
  a display panel having an array of display pixels for producing a display, the display pixels being arranged in rows and columns;
  an array of lens elements arranged over the display panel for directing the light output of the display pixels so as to provide a stereoscopic image, the lens elements comprising an electro-optic material whose refractive index is switchable by selective application of an electric field between a first value that maintains the light output directing function and a second values that removes the light output directing function; and
  first and second electrode layers provided on opposite sides of the lens element array for applying the electric field across the lens elements, wherein the electrode layers are segmented with the first electrode layer comprising an array of row electrode lines and the second electrode layer comprises an array of column electrode lines, wherein the device further comprises a driver circuit for applying drive signals to the electrode lines to control the switching of the lens elements, wherein the drive signals comprise:

a row select voltage waveform;
a column select voltage waveform; and
a common row and column de-select voltage waveform, and wherein the waveforms each comprise a substantially square wave voltage waveform, each waveform having the same period, with the three waveforms comprising each of the three possible timings to provide relative phase shifts of $2\pi/3$.

This arrangement provides polarity inversion voltage waveforms when switching voltages are applied to the lens elements, and with maximised RMS voltage.

Preferably, either the row select voltage waveform or the de-select voltage waveform is applied to the rows and either the column select voltage waveform or the de-select voltage waveform is applied to the columns. Thus, the selection can comprises selecting one of two possible voltage waveforms for each row and column.

Each waveform is preferably a square wave waveform between equal magnitude positive and negative voltages.

The RMS voltage of each of the following difference signals is preferably approximately $2\sqrt{(2/3)} A_{drive}$, where $A_{drive}$ is the equal magnitude positive and negative voltage:

the difference between the row and column select voltage waveforms;
the difference between the column select voltage waveform and the common de-select voltage waveform; and
the difference between the row select voltage waveform and the common de-select voltage waveform.

This provides a high RMS voltage from the output voltage of the driver used to control the lens array.

The array of lens elements may comprise an array of parallel lenticular lens elements and the electro-optic material may comprise a liquid crystal material. The display panel may also be a liquid crystal display panel, although other types of display panel can be used.

The invention also provides a driver for controlling a switchable lens element array of a switchable autostereoscopic display device, the driver being for controlling first and second electrode layers provided on opposite sides of the lens element array for applying an electric field across the lens elements, with the electrode layers segmented with the first electrode layer comprising an array of row electrode lines and the second electrode layer comprising an array of column electrode lines, wherein the driver circuit comprises means for generating drive signals for the electrode lines to control the switching of the lens elements, wherein the drive signals comprise:

a row select voltage waveform;
a column select voltage waveform; and
a common row and column de-select voltage waveform, and wherein the waveforms each comprise a substantially square wave voltage waveform, each waveform having the same period, with the three waveforms comprising each of the three possible timings to provide relative phase shifts of $2\pi/3$.

The invention also provides a method of controlling a switchable lens element array of a switchable autostereoscopic display device, by controlling first and second electrode layers provided on opposite sides of the lens element array for applying an electric field across the lens elements, with the electrode layers segmented with the first electrode layer comprising a first array of row electrode lines and the second electrode layer comprising an array of column electrode lines, wherein the method comprises selectively applying drive signals to the electrode lines, the drive signals comprising:

a row select voltage waveform;
a column select voltage waveform; and
a common row and column de-select voltage waveform, wherein the waveforms each comprise a substantially square wave voltage waveform, each waveform having the same period, with the three waveforms comprising each of the three possible timings to provide relative phase shifts of $2\pi/3$.

The selective application of drive signals can comprise selecting a lens element or elements by applying the row select voltage waveform to the corresponding row electrode line or applying the column select voltage waveform to the corresponding column electrode line or both. Deselecting a lens element or elements can be achieved by applying the de-select voltage waveform to the corresponding row electrode line and applying the de-select voltage waveform to the corresponding column electrode line.

In one example, selecting a lens element or elements comprises operating an associated portion of the display in 2D mode and deselecting a lens element or elements comprises operating an associated portion of the display in 3D mode.

BRIEF DESCRIPTION OF THE DRAWINGS

An embodiment of the invention will now be described, purely by way of example, with reference to the accompanying drawings, in which.

DETAILED DESCRIPTION OF EMBODIMENTS

The invention provides a drive method and apparatus for an autostereoscopic display with a switchable lens array having a matrix of control lines to control the switching of the lens elements. The drive signals comprise:

a row select voltage waveform;
a column select voltage waveform; and
a common row and column de-select voltage waveform.

The waveforms each comprise a substantially square wave voltage waveform, each waveform having the same period. The three waveforms are time staggered with respect to each other so that there are six equal length phases within the period. Each phase has a different combination of values for the three waveforms, and there is a phase shift of $2\pi/3$ or $4\pi/3$ between each waveform and each other waveform.

This arrangement provides polarity inversion voltage waveforms when switching voltages are applied to the lens elements, and with maximised RMS voltage.

Figure 1:
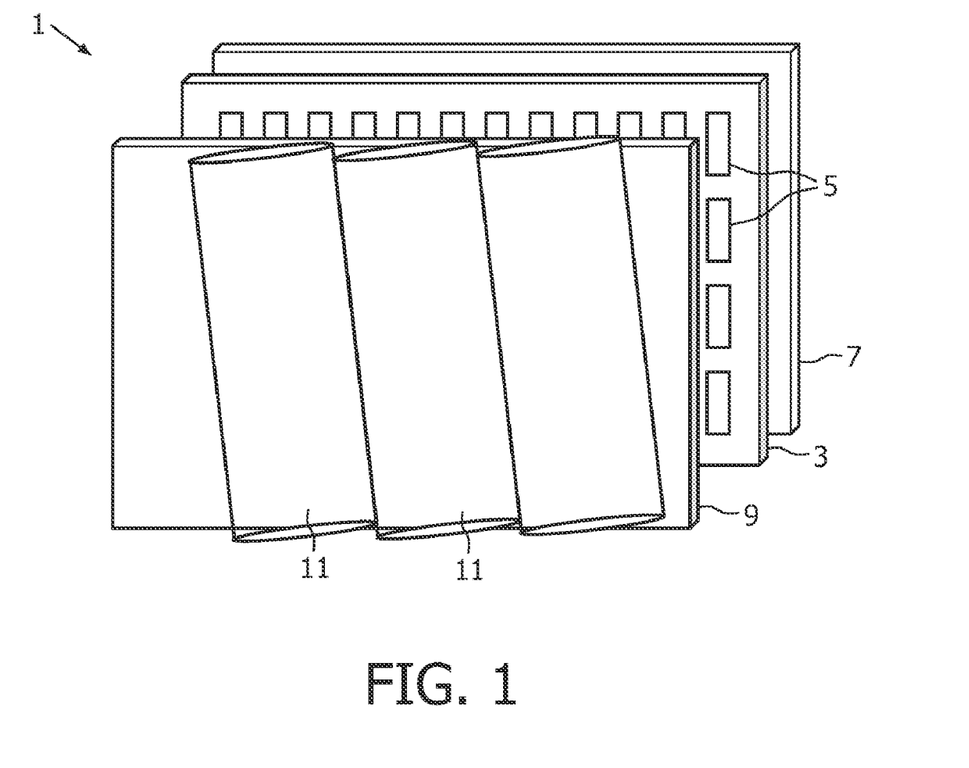
FIG. 1 is a schematic perspective view of a known autostereoscopic display device.

FIG. 1 is a schematic perspective view of a known direct view autostereoscopic display device 1. The known device 1 comprises a liquid crystal display panel 3 of the active matrix type that acts as a spatial light modulator to produce the display.

The display panel 3 has an orthogonal array of display pixels 5 arranged in rows and columns. For the sake of clarity, only a small number of display pixels 5 are shown in the Figure. In practice, the display panel 3 might comprise about one thousand rows and several thousand columns of display pixels 5.

The structure of the liquid crystal display panel 3 is entirely conventional. In particular, the panel 3 comprises a pair of spaced transparent glass substrates, between which an aligned twisted nematic or other liquid crystal material is provided. The substrates carry patterns of transparent indium tin oxide (ITO) electrodes on their facing surfaces. Polarising layers are also provided on the outer surfaces of the substrates.

In one example, each display pixel 5 comprises opposing electrodes on the substrates, with the intervening liquid crystal material therebetween. The shape and layout of the display pixels 5 are determined by the shape and layout of the electrodes. The display pixels 5 are regularly spaced from one another by gaps.

Each display pixel 5 is associated with a switching element, such as a thin film transistor (TFT) or thin film diode (TFD). The display pixels are operated to produce the display by providing addressing signals to the switching elements, and suitable addressing schemes will be known to those skilled in the art.

The display panel 3 is illuminated by a light source 7 comprising, in this case, a planar backlight extending over the area of the display pixel array. Light from the light source 7 is directed through the display panel 3, with the individual display pixels 5 being driven to modulate the light and produce the display.

The display device 1 also comprises a lenticular sheet 9, arranged over the display side of the display panel 3, which performs a view forming function. The lenticular sheet 9 comprises a row of lenticular elements 11 extending parallel to one another, of which only one is shown with exaggerated dimensions for the sake of clarity.

The lenticular elements 11 are in the form of convex cylindrical lenses, and they act as a light output directing means to provide different images, or views, from the display panel 3 to the eyes of a user positioned in front of the display device 1.

The autostereoscopic display device 1 shown in FIG. 1 is capable of providing several different perspective views in different directions. In particular, each lenticular element 11 overlies a small group of display pixels 5 in each row. The lenticular element 11 projects each display pixel 5 of a group in a different direction, so as to form the several different views. As the user's head moves from left to right, his/her eyes will receive different ones of the several views, in turn.

Figure 2:
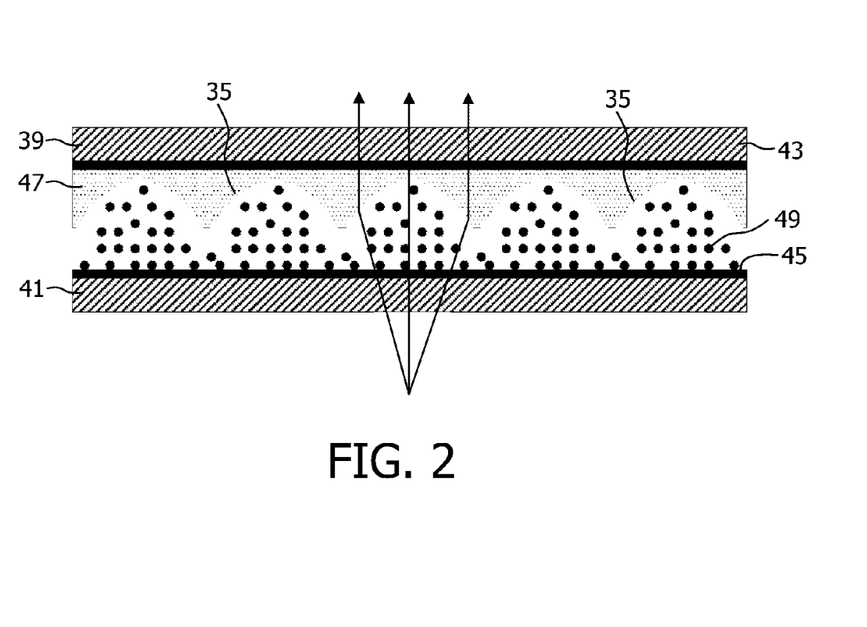
FIGS. 2 and 3 are used to explain the operating principle of the lens array of the display device shown in FIG. 1.
Figure 3:
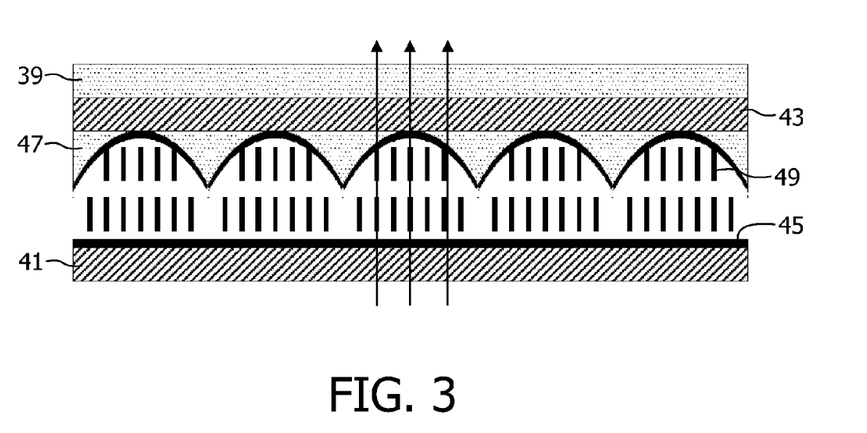

It has been proposed to provide electrically switchable lens elements, as mentioned above. This enables the display to be switched between 2D and 3D modes. FIGS. 2 and 3 schematically show an array of electrically switchable lenticular elements 35 which can be employed in the device shown in FIG. 1. The array comprises a pair of transparent glass substrates 39, 41, with transparent electrodes 43, 45 formed of indium tin oxide (ITO) provided on their facing surfaces. An inverse lens structure 47, formed using a replication technique, is provided between the substrates 39, 41, adjacent to an upper one of the substrates 39. Liquid crystal material 49 is also provided between the substrates 39, 41, adjacent to the lower one of the substrates 41.

The inverse lens structure 47 causes the liquid crystal material 49 to assume parallel, elongate lenticular shapes, between the inverse lens structure 47 and the lower substrate 41, as shown in cross-section in the Figure. Surfaces of the inverse lens structure 47 and the lower substrate 41 that are in contact with the liquid crystal material are also provided with an orientation layer (not shown) for orientating the liquid crystal material.

FIG. 2 shows the array when no electric potential is applied to the electrodes 43, 45. In this state, the refractive index of the liquid crystal material 49 is substantially higher than that of the inverse lens array 47, and the lenticular shapes therefore provide a light output directing function, as illustrated.

FIG. 3 shows the array when an alternating electric potential of approximately 50 to 100 volts is applied to the electrodes 43, 45. In this state, the refractive index of the liquid crystal material 49 is substantially the same as that of the inverse lens array 47, so that the light output directing function of the lenticular shapes is cancelled, as illustrated. Thus, in this state, the array effectively acts in a "pass through" mode. Further details of the structure and operation of arrays of switchable lenticular elements suitable for use in the display device shown in FIG. 1 can be found in U.S. Pat. No. 6,069,650, the entire content of which is incorporated herein by reference.

This invention concerns in particular the voltages applied to the electrically switchable lens array. The switchable lenticular is switched by means of a sufficiently high voltage. However, it is also desired to maintain low drive voltages in order to keep the cost of the driver circuitry down. There is therefore a conflict between the drive electronics and the requirement to provide rapid switching and sustained holding of the different modes of the switchable lens array.

The requirements for driving the locally switchable lens array are:

(i) To switch a cell completely, the RMS voltage should be sufficiently high. This voltage should be equal for each switched cell.

(ii) A cell should receive zero net voltage in the off state.

(iii) Symmetric voltages are necessary to avoid charging of the cell (a polarity inversion drive scheme).

(iv) The driver voltage should be as low as possible.

This invention is based on the recognition that the drive scheme should be selected as an optimisation of the driver signals, by maximizing the RMS voltage at each cell for a given driver circuit output voltage.

Figure 4:
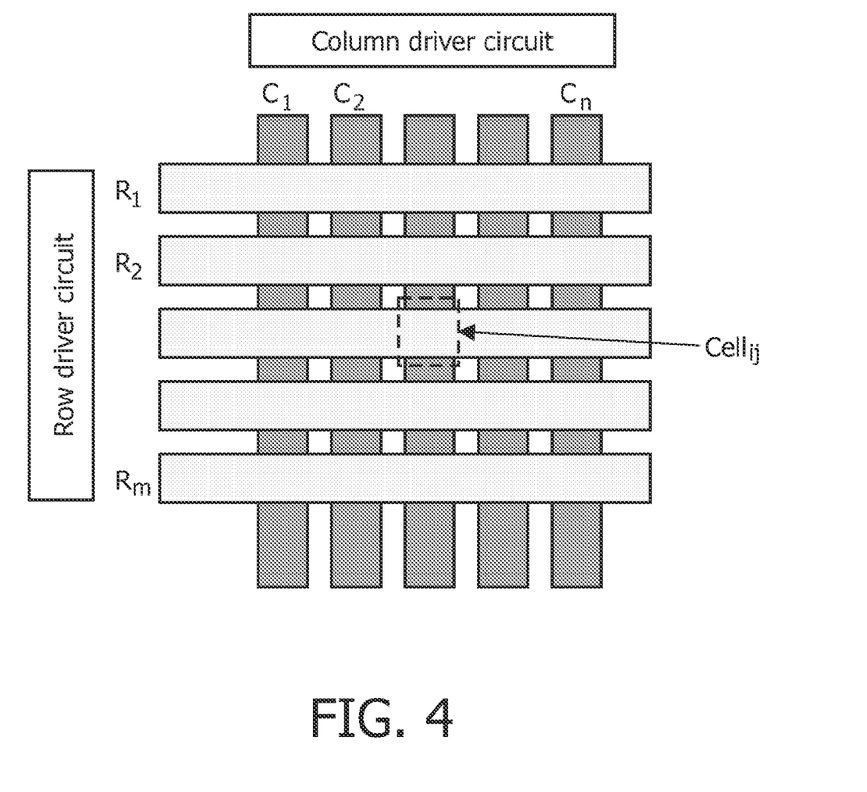
FIG. 4 shows the electrode arrangement and driver for the lens array of the display device of the invention.

FIG. 4 shows the electrode matrix arrangement. One electrode array comprises an array of parallel column electrodes $C_1 \ldots C_n$, and the other electrode array comprises an array of parallel row electrodes $R_1 \ldots R_m$.

Each column is connected to one of two voltage drive levels, $C_{SW}$ or $C_{base}$ to select if the cells at that column should be switched or not. In the same way, each row is connected to one of two voltage drive levels $R_{SW}$ or $R_{base}$.

FIG. 4 schematically shows row and column driver circuitry for providing the drive signals to the row and column electrodes. This includes circuitry for generating voltage waveforms. As described further below, the voltage waveforms can have only two levels of equal and opposite magnitude. These can be supplied to the driver circuitry from an external source or can be generated internally.

The drive voltages result in four possible signal combinations at each cell. The cell should be switched if at least one of the signals is connected to a switch signal (giving rise to a sufficient RMS voltage to provide the desired switching. If the row and column are both connected to the base signal, the LC should not be switched. (zero RMS voltage). The possible signal combinations are shown in Equations (1) below:

1) $V = C_{SW} - R_{SW}$   $V_{rms} = \sqrt{\frac{1}{T}\int_0^T [C_{sw} - R_{sw}]^2 dt}$ 2) $V = C_{SW} - R_{base}$   $V_{rms} = \sqrt{\frac{1}{T}\int_0^T [C_{sw} - R_{base}]^2 dt}$ 3) $V = C_{base} R_{SW}$   $V_{rms} = \sqrt{\frac{1}{T}\int_0^T [C_{base} - R_{sw}]^2 dt}$ 4) $V = C_{base} - R_{base}$   $V_{rms} = \sqrt{\frac{1}{T}\int_0^T [C_{base} - R_{base}]^2 dt}$ The last equation corresponds to the situation in which the cell should receive a zero voltage. This means automatically that $C_{base}=R_{base}$. Thus, a single value can be used to represent this voltage value, and it will be termed $V_{base}$.

The first three equations can be summed to give:

$$3V_{rms}^2 = \frac{1}{T}\int_0^T ([C_{sw} - R_{sw}]^2 + [C_{sw} - V_{base}]^2 + [V_{base} - R_{sw}]^2) dt$$

This rewrites as:

$$3V_{rms}^2 = \frac{1}{T}\int_0^T (2C_{sw}^2 + 2R_{sw}^2 + 2V_{base}^2 - 2C_{cw}R_{cw} - 2C_{cw}V_{base} - 2R_{cw}V_{base}) dt$$

This rewrites as Equation (2):

$$3V_{rms}^2 = \frac{1}{T}\int_0^T (3[C_{sw}^2 + R_{sw}^2 + V_{base}^2] - [C_{cw} + V_{base} + R_{cw}]^2) dt$$

The maximum RMS voltage of a symmetric signal with a given maximum amplitude is obtained for square signals. This implies a drive scheme in which the voltage at a row or column is either the maximum positive drive voltage $+A_{driver}$ or the maximum amplitude negative drive voltage $-A_{driver}$.

For the first half of the integral of equation (2), the sign of the drive signals does not matter due to the squared functions. In order to minimize the second half of the integral (which is subtracted to derive the RMS value), one of the three signals $C_{SW}$, $V_{base}$ or $R_{SW}$ should have the opposite sign of the others.

When this is implemented, the equation simplifies to:

$$3V_{rms,max}^2 = \frac{1}{T}\int_0^T (9A_{driver}^2 - A_{driver}^2) dt$$

From this, the RMS voltage can be expressed as Equation (3):

$$V_{rms,max} = \sqrt{\frac{2}{3}}\, 2A_{driver}$$

The drive scheme which is derived from the approach above has the drivers switching between $+A_{driver}$ or $-A_{driver}$. As a result, the net cell voltage of each cell at each time instance is either $\pm 2 A_{driver}$ or 0 volts. This means that in the optimal situation for which $V_{rms,max} = 2A_{driver} mt;epmrl;\sqrt{2/3}rlxmx$, in ⅔ of the period time the cell receives a net voltage of $\pm 2 A_{driver}$ and in ⅓ of the period time the cell is set at 0 volts net voltage.

If the cell is not switched it instead constantly receives a zero voltage difference.

Figure 5:
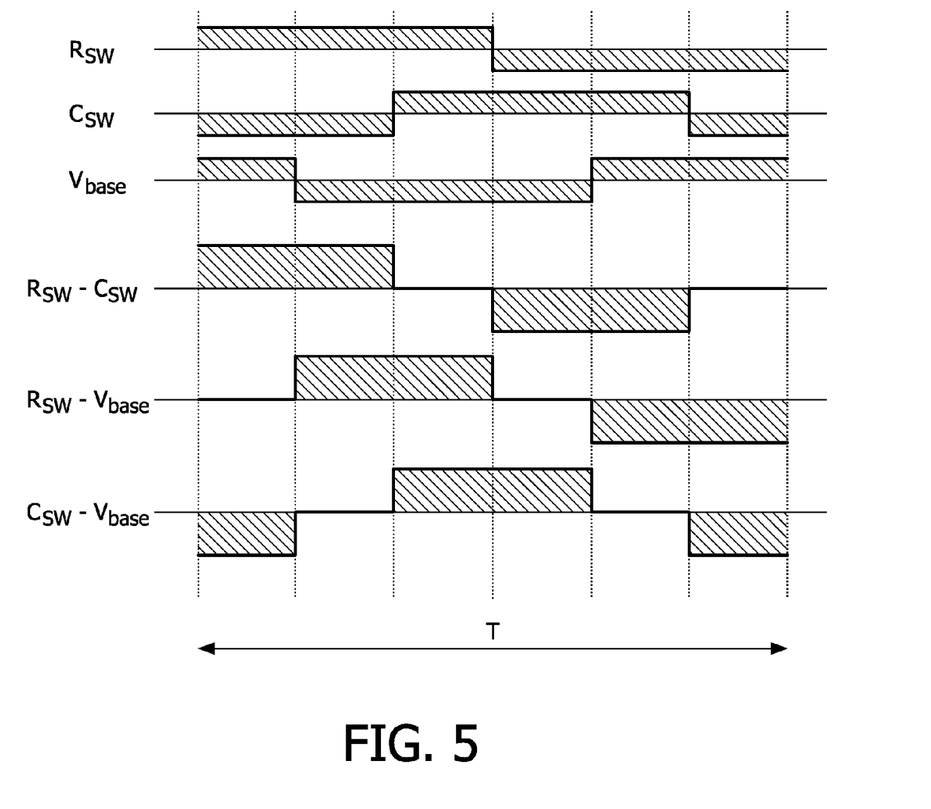
FIG. 5 is a timing diagram to explain the method of the invention.

FIG. 5 shows one drive scheme derived from the analysis above. It will be apparent that there are many ways of implementing drive schemes which enable the maximum RMS voltage to be obtained from the driver voltage using the approach above. The example of FIG. 5 has each voltage as a square wave, with a phase shift of $2\pi/3$ between the signals $R_{SW}$, $C_{SW}$ and $V_{base}$.

As explained above, this drive scheme gives an RMS voltage for each cell of $V_{rms,cell}=2\sqrt{2/3}A_{driver}$.

FIG. 5 shows a time period T which corresponds to both phases of a polarity inversion scheme. As shown, the time period T is divided into six sub-periods, and during each of these time periods, a different combination of voltages are used for the three control voltages $R_{SW}$, $C_{SW}$ and $V_{base}$.

Depending on the combination of voltages applied to the row and column, one of the three voltages $R_{SW}$-$C_{SW}$, $R_{SW}$-$V_{base}$ or $C_{SW}$-$V_{base}$ will be present across the cell. Alternatively, there will be zero volts across the cell, if $V_{base}$ is applied to the row and column.

For each of the non-zero voltages as plotted, three of the sub-periods can be considered to be a positive polarity phase and three of the sub-periods can be considered to be a negative polarity phase.

Using the voltage $R_{SW}$-$C_{SW}$ as an example, the voltage $R_{SW}$-$C_{SW}$ is equal to double the drive peak voltage $A_{driver}$ for the first two sub-periods and zero for the third sub-period.

The second three sub-periods can be considered to be a negative polarity phase, and as shown the voltage $R_{SW}$-$C_{SW}$ has a magnitude again equal to double the drive peak voltage $A_{driver}$ for the first two sub-periods and zero for the third sub-period. The sign of the voltage across the cell is inverted compared to the positive polarity phase.

Each of the possible three voltages plotted has this property, of polarity inversion and of two sub-periods at $2A_{driver}$ and one at zero.

This drive scheme thus provides local polarity inversion (twice in each period T) and provides the greatest RMS voltage which can be achieved from the peak driver voltage level. The row and column lines are controlled by applying one of two possible voltage waveforms to each row and column, and one of these voltage waveforms ($V_{base}$) is shared, so that there are three different voltage waveforms in total.

The most common implementation of this type of switchable lens array has a zero volt drive for the 3D mode, and the high RMS voltage drive for the 2D mode. Selected areas are thus turned off the 3D mode by the application of the voltage waveforms shown in FIG. 5.

There is not complete freedom to control the operating mode of all areas of the display. In particular 3D windows are possible and not 2D windows. This is explained with reference to FIG. 6 which shows the row and column signals applied to switch selected areas to the 2D mode for a simple 2×2 array. This also assumes the case where the lens array is switched to the 2D mode. In FIG. 6, the 2D mode is shown as the hatched areas.

Figure 6A:
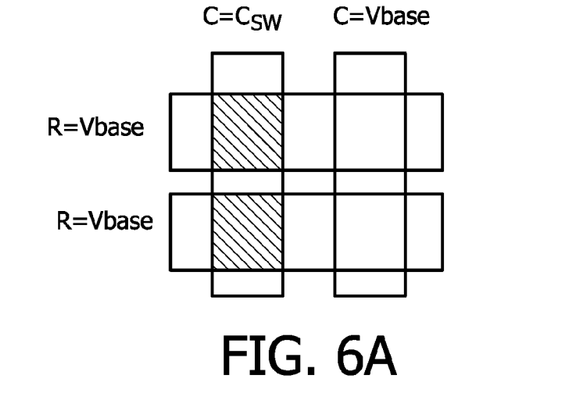
FIG. 6 shows various ways in which the waveforms of FIG. 5 can be used.

FIG. 6A shows the left column switched to the 2D mode, and this has the left column with the switching voltage $C_{SW}$ applied and all other rows and columns with the voltage $V_{base}$.

Figure 6B:
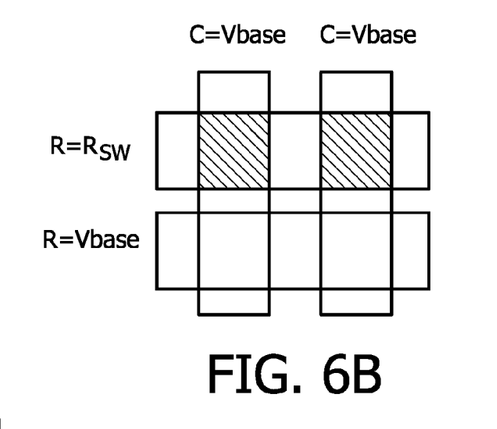

FIG. 6B shows the top row switched to the 2D mode, and this has the top row with the switching voltage $R_{SW}$ applied and all other rows and columns with the voltage $V_{base}$.

Figure 6C:
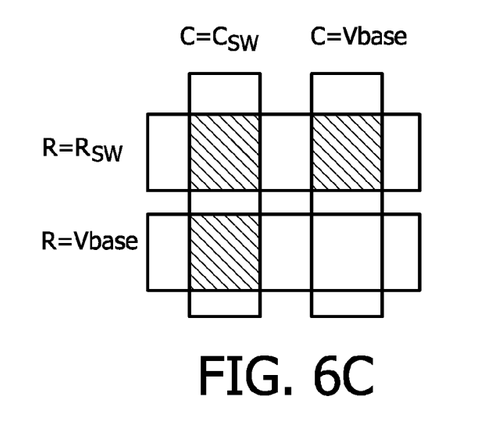

FIG. 6C shows that individual areas can be left in the 3D mode. In the example, only the bottom right corner is in the 3D mode with the remainder in 2D mode. It is not possible to select individual areas for the 2D mode. Instead, a full row or column needs to be switched to 2D mode.

Figure 6D:
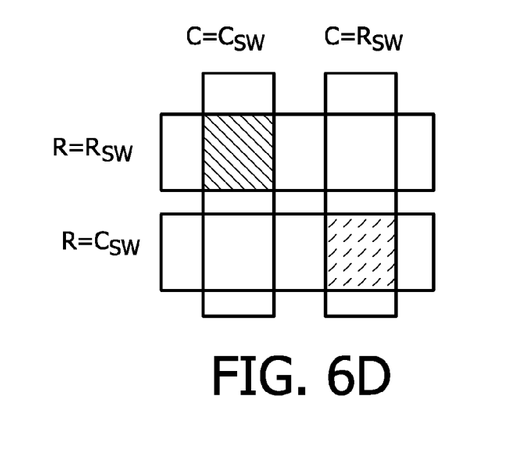

If desired, an alternative is to have diagonal areas in 2D mode, as shown in FIG. 6D. In this example the voltage $V_{base}$ is not used at all, but instead the 3D mode is made by applying the same column or row voltages $R_{SW}$, $C_{SW}$. The top left area is switched to 2D mode, but the bottom right area still cannot be held in 3D mode, and also switches to 2D mode. This requires the rows and columns to be switchable between three voltage waveforms rather than two. Thus, this addition option is not preferred. Instead, it is preferred to limit the functionality to FIGS. 6A to 6C, in which case each row and column is switched between only two voltage waveforms.

Splitting the period T at an arbitrary position and changing the order of the two sides does not change its RMS value, or the polarisation inversion operation. Therefore signal shapes that result from random ordering of all parts within the period T also result in optimal driving.

A specific example of the invention have been described above. However, it will be apparent to those skilled in the art that various changes and modifications may be made to these embodiments, without departing from the scope of the invention.

The example described above employs lenticular elements comprising liquid crystal having a switchable refractive index. However, graded index (GRIN) lenses may alternatively be employed as light output directing elements, as will be understood by those skilled in the art. The lenses may also be non-cylindrical.

The example described above employs a liquid crystal display panel having, for example, a display pixel pitch in the range 50 µm to 1000 µm. However, it will be apparent to those skilled in the art that alternative types of display panel may be employed, such as organic light emitting diode (OLED) or cathode ray tube (CRT) display devices. The display device described above may employ lenticular elements that are slanted at an acute angle to the column direction of the display pixels, as is known in conventional autostereoscopic display devices.

The manufacture and materials used to fabricate the display device have not been described in detail, as these will be conventional and well known to those skilled in the art. The switching electrodes will be transparent, and will typically comprise indium tin oxide.

The example given above relates to a design in which the high voltage mode gives the 2D mode, and zero applied voltage gives the 3D mode. The lens arrangement may be designed to give the opposite function.

It is of course not possible in practice to achieve perfectly square voltage waveforms, and the invention provides "substantially square wave voltage waveforms". These are waveforms intended to be square but which will in practice have non-perfect rise and fall edges. Furthermore minor changes even in the intended shape are intended to be covered by the claims. For example, a ripple in the high level, slight delays in the rise and fall time, as well as general rounding are intended to be covered by the term "substantially square".

The driver circuit has not been described in detail. As will be apparent, it simply applies selected voltage waveforms to the electrodes, and these are also simply time delayed versions of each other. Shift register circuits can be used to implement the timing between different signals, and the application of selected voltages to the electrodes will be routine.

Various other modifications will be apparent to those skilled in the art.

The invention claimed is:

1. A switchable autostereoscopic display device, comprising:
    a display panel having an array of display pixels for producing a display, the array of display pixels being arranged in rows and columns;
    an array of lens elements arranged over the display panel for directing the light output of the array of display pixels so as to provide a stereoscopic image, the array of lens elements comprising an electro-optic material whose refractive index is switchable by selective application of an electric field between a first value that maintains the light output directing function and a second values that removes the light output directing function; and
    first ($R_1 \ldots R_m$) and second ($C_1 \ldots C_n$) electrode layers provided on opposite sides of the array of lens elements for applying the electric field across the array of lens elements,
    wherein the electrode layers are segmented with the first electrode layer comprising an array of row electrode lines ($R_1 \ldots R_m$) and the second electrode layer comprises an array of column electrode lines ($C_1 \ldots C_n$),
    wherein the device further comprises a driver circuit for applying drive signals to the electrode lines to control the switching of the array of lens elements, wherein the drive signals comprise:
    a row select voltage waveform ($R_{SW}$);
    a column select voltage waveform ($C_{SW}$); and
    a common row and column de-select voltage waveform ($V_{base}$),
    and wherein the waveforms each comprise a substantially square wave voltage waveform, each waveform having the same period, with the three waveforms comprising each of the three possible timings to provide relative phase shifts of $2\pi/3$.

2. The device as claimed in claim 1, wherein each waveform is a square wave waveform between equal magnitude positive and negative voltages ($A_{drive}$).

3. The device as claimed in claim 2, wherein the RMS voltage of each of the following difference signals is approximately $2\sqrt{(2/3)} A_{drive}$, where $A_{drive}$ is the equal magnitude positive and negative voltage:
    the difference between the row and column select voltage waveforms ($R_{SW}$, $C_{SW}$);
    the difference between the column select voltage waveform and the common de-select voltage waveform ($C_{SW}$, $V_{base}$); and
    the difference between the row select voltage waveform and the common de-select voltage waveform ($R_{SW}$, $V_{base}$).

4. The device as claimed in claim 1, wherein the array of lens elements comprises an array of parallel lenticular lens elements.

5. The device as claimed in claim 1, wherein the electro-optic material comprises a liquid crystal material.

6. The device as claimed in claim 1, wherein the electrode lines comprise indium tin oxide.

7. A device as claimed in claim 1, wherein the display panel (3) is a liquid crystal display panel.

8. A driver circuit for controlling a switchable lens element array of a switchable autostereoscopic display device, the driver controlling first and second electrode layers provided on opposite sides of the switchable lens element array for applying the electric field across lens elements, with the electrode layers segmented with the first electrode layer comprising an array of row electrode lines ($R_1 \ldots R_m$) and the second electrode layer comprising an array of column electrode lines ($C_1 \ldots C_n$), wherein the driver circuit comprises means for generating drive signals for the electrode lines to control the switching of the lens elements, wherein the drive signals comprise:

a row select voltage waveform ($R_{SW}$);

a column select voltage waveform ($C_{SW}$); and a common row and column de-select voltage waveform ($V_{base}$), and wherein the waveforms each comprise a substantially square wave voltage waveform, each waveform having the same period, with the three waveforms comprising each of the three possible timings to provide relative phase shifts of $2\pi/3$.

9. The driver circuit as claimed in claim 8, wherein each waveform is a square wave waveform between equal magnitude positive and negative voltages ($A_{drive}$).

10. The driver circuit as claimed in claim 9, wherein the RMS voltage of each of the following difference signals is approximately $2\sqrt{(2/3)} A_{drive}$, where $A_{drive}$ is the equal magnitude positive and negative voltage:

the difference between the row and column select voltage waveforms ($R_{SW}$, $C_{SW}$);

the difference between the column select voltage waveform and the common de-select voltage waveform ($C_{SW}$, $V_{base}$); and the difference between the row select voltage waveform and the common de-select voltage waveform ($R_{SW}$, $V_{base}$).

11. A method of controlling a switchable lens element array of a switchable autostereoscopic display device, by controlling first and second electrode layers provided opposite sides of the switchable lens element array for applying the electric field across lens elements, with the electrode layers segmented with the first electrode layer comprising a first array of row electrode lines ($R_1 \ldots R_m$) and the second electrode layer comprising an array of column electrode lines ($C_1 \ldots C_n$), wherein the method comprises selectively applying drive signals to the electrode lines, the drive signals comprising:

a row select voltage waveform ($R_{SW}$);

a column select voltage waveform ($C_{SW}$); and a common row and column de-select voltage waveform ($V_{base}$), wherein the waveforms each comprise a substantially square wave voltage waveform, each waveform having the same period, with the three waveforms comprising each of the three possible timings to provide relative phase shifts of $2\pi/3$.

12. The method as claimed in claim 11, wherein the selective application of drive signals comprises selecting a lens element or elements by applying the row select voltage waveform to the corresponding row electrode line or applying the column select voltage waveform to the corresponding column electrode line or both.

13. The method as claimed in claim 12, wherein the selective application of drive signals comprises deselecting a lens element or elements by applying the de-select voltage waveform to the corresponding row electrode line and applying the de-select voltage waveform to the corresponding column electrode line.

14. The method as claimed in claim 12, wherein selecting a lens element or elements comprises operating an associated portion of the display in 2D mode and deselecting a lens element or elements comprises operating an associated portion of the display in 3D mode.

* * * * *